(12) United States Patent
Montuori et al.

(10) Patent No.: US 9,821,540 B2
(45) Date of Patent: Nov. 21, 2017

(54) PRE-SLIT DONUT BREAK SEAL

(75) Inventors: Daniel Salvatore Montuori, Niskayauna, NY (US); Jeffrey K. Groth, Burnt Hills, NY (US); Leland E. Moll, Schuylerville, NY (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 999 days.

(21) Appl. No.: 13/234,972

(22) Filed: Sep. 16, 2011

(65) Prior Publication Data

US 2012/0067883 A1    Mar. 22, 2012

Related U.S. Application Data

(60) Provisional application No. 61/384,167, filed on Sep. 17, 2010.

(51) Int. Cl.
| | |
|---|---|
| *B32B 5/18* | (2006.01) |
| *B32B 27/00* | (2006.01) |
| *B32B 7/04* | (2006.01) |
| *B32B 3/26* | (2006.01) |
| *B32B 37/06* | (2006.01) |

(Continued)

(52) U.S. Cl.
CPC ........... *B32B 37/065* (2013.01); *B32B 38/04* (2013.01); *B32B 37/203* (2013.01); *B32B 2307/72* (2013.01); *B32B 2309/105* (2013.01); *B32B 2439/70* (2013.01); *Y10T 156/1052* (2015.01); *Y10T 156/1082* (2015.01)

(58) Field of Classification Search
CPC .... B65D 41/20; B65D 41/205; B65D 41/505; B65D 41/32; B65D 41/50; B65D 53/04; B65D 5/00; B32D 41/50; B32B 5/00; B32B 5/18; B32B 2266/00; B32B 2266/25; B32B 2266/0292; B32B 2327/12; B32B 2327/18; B32B 2439/70; B32B 2435/00; B32B 2435/02; B32B 27/322; B32B 7/04; B32B 3/26; B32B 3/266; Y10T 428/215; F16J 15/00; F16J 13/00

USPC .... 428/66.4, 304.4, 156, 172; 215/232, 247, 215/341, 348, 349, 352; 220/359.3, 220/367.1, 200

See application file for complete search history.

(56) References Cited

U.S. PATENT DOCUMENTS 1,857,015 A    5/1932  Gere
3,580,423 A *  5/1971  Gilman .......................... 222/81
(Continued)

FOREIGN PATENT DOCUMENTS

CN    1192454 A    9/1998
CN    1646304 A    7/2005
(Continued)

OTHER PUBLICATIONS

International Search Report dated Apr. 12, 2012 from International Application No. PCT/US2011/051978 filed Sep. 16, 2011.

(Continued)

*Primary Examiner* — Joanna Pleszczynska
(74) *Attorney, Agent, or Firm* — Abel Law Group, LLP; Chi Suk Kim

(57) ABSTRACT

A break seal is provided which comprises a foam sheet and a film layer. The foam sheet comprises a center hole. The film layer is partially scored through the thickness.

11 Claims, 5 Drawing Sheets

(51) Int. Cl.
*B32B 38/04* (2006.01)
*B32B 37/20* (2006.01)

(56) References Cited

U.S. PATENT DOCUMENTS

| | | | |
|---|---|---|---|
| 3,580,426 | A | 5/1971 | Manning |
| 3,670,914 | A | 6/1972 | Poulsen, Jr. |
| 4,079,950 | A | 3/1978 | Langford |
| 4,133,457 | A | 1/1979 | Klassen |
| 4,938,390 | A | 7/1990 | Markva |
| 4,949,857 | A | 8/1990 | Russell |
| 5,100,394 | A | 3/1992 | Dudar et al. |
| 5,979,904 | A | 11/1999 | Balsells |
| 6,306,971 | B1 | 10/2001 | Betremieux et al. |
| 6,457,613 | B1 | 10/2002 | Patterson |
| 6,520,943 | B1 | 2/2003 | Wagner |
| 6,569,125 | B2 | 5/2003 | Jepson et al. |
| 6,605,076 | B1 | 8/2003 | Jepson et al. |
| 6,846,551 | B2 | 1/2005 | Genske et al. |
| 7,055,824 | B2 | 6/2006 | Kobayashi et al. |
| RE39,340 | E * | 10/2006 | Adams et al. ............... 215/253 |
| 7,337,928 | B2 | 3/2008 | Jackman |
| 7,461,754 | B2 * | 12/2008 | Walsh ............................ 215/307 |
| 7,569,275 | B2 | 8/2009 | Fukushi et al. |
| 2004/0173556 | A1 | 9/2004 | Smolko et al. |
| 2006/0272289 | A1 | 12/2006 | Pausa et al. |
| 2008/0206847 | A1 | 8/2008 | Kunas et al. |
| 2009/0212054 | A1 * | 8/2009 | Allen, Jr. ................... 220/254.1 |
| 2010/0000414 | A1 | 1/2010 | Williams et al. |
| 2010/0201082 | A1 | 8/2010 | Hart |
| 2012/0043330 | A1 | 2/2012 | McLean et al. |

FOREIGN PATENT DOCUMENTS

| | | |
|---|---|---|
| DE | 102005008786 | 8/2016 |
| EP | 2194108 A1 | 6/2010 |
| JP | H10-202803 A | 8/1998 |
| JP | 2003-334234 A | 11/2003 |
| JP | 2006055670 A | 3/2006 |
| KR | 20090101352 A | 9/2009 |
| WO | 8607010 | 12/1986 |
| WO | 9006269 A1 | 6/1990 |
| WO | 9301103 A1 | 1/1993 |
| WO | 99/32557 A1 | 7/1999 |
| WO | 9965434 A1 | 12/1999 |
| WO | 02059516 A2 | 8/2002 |
| WO | 03101858 A2 | 12/2003 |
| WO | 2004094491 A1 | 11/2004 |
| WO | 2006018556 A1 | 2/2006 |
| WO | 2009015210 A2 | 1/2009 |
| WO | 2010/078527 A2 | 7/2010 |
| WO | 2012037483 A2 | 3/2012 |

OTHER PUBLICATIONS

TRI SEAL, Technical Data Sheet: F-217-3, 1 page.
NORTON: High Performance Films, T-100 Premium Grade:Skived PTFE Film, 1 page.
Supplemental European Search Report from EP11826039 dated Feb. 15, 2016, 1 pg.

* cited by examiner

PRE-SLIT DONUT BREAK SEAL

CROSS-REFERENCE TO RELATED APPLICATION(S)

The present application claims priority from U.S. Provisional Patent Application No. 61/384,167, filed Sep. 17, 2010, entitled "Pre-slit donut break seal," naming inventor Daniel S. Montuori, Jeffrey K. Groth, Leland E. Moll, which application is incorporated by reference herein in its entirety.

FIELD OF THE DISCLOSURE

This disclosure, in general, relates to pre-slit break seals and methods of forming pre-slit break seals.

BACKGROUND

Break seals are used in laboratories as seals for containers. The seals are placed in the neck of a container, leading to a hermetic seal in the bottle. Break seals are often used with hazardous chemicals in order to reduce the chance of exposure to hazardous chemicals. Break seals can also be used to decrease the chance of chemical spillage before the seal is broken. Break seals can further be used with sterilized fittings to prevent contamination, particularly with biological contaminants.

Break seals currently available have a number of drawbacks, such as being expensive and complicated to manufacture and being physically weak such that the seal breaks before a desired time. Other seals are made with adhesives that can leach into fluids within the container, contaminating the fluids.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In a particular embodiment, a seal includes a foam sheet and a film layer directly contacting the foam sheet without intervening layers. The foam sheet comprises first and second major surfaces and has an outer contour and an inner contour. The inner contour defines a center opening in the foam sheet with a diameter of about 0.895 inches. In particular, the foam sheet can be formed of a thermoplastic polymer such as polyethylene. The film layer extends across the surface of the foam sheet, including across the center opening of the foam sheet. The film layer is scored in a star shape. The star shape can have at least eight points. In particular, the film layer can be formed of a fluoropolymer such as a perfluoropolymer, for example, polytetrafluoroethylene (PTFE).

In an exemplary embodiment, a method of forming a seal includes dispensing a foam sheet horizontally and dispensing a film layer horizontally, below and adjacent to the foam sheet. The foam sheet and film layer are heated with an open flame placed between the sheet and layer and pressed together to form a layered laminate. The layered laminate is cooled on a series of cooling rollers to a predetermined temperature. After cooling, the laminate is cut into seals, and the film layer of each seal is scored.

Figure 1:
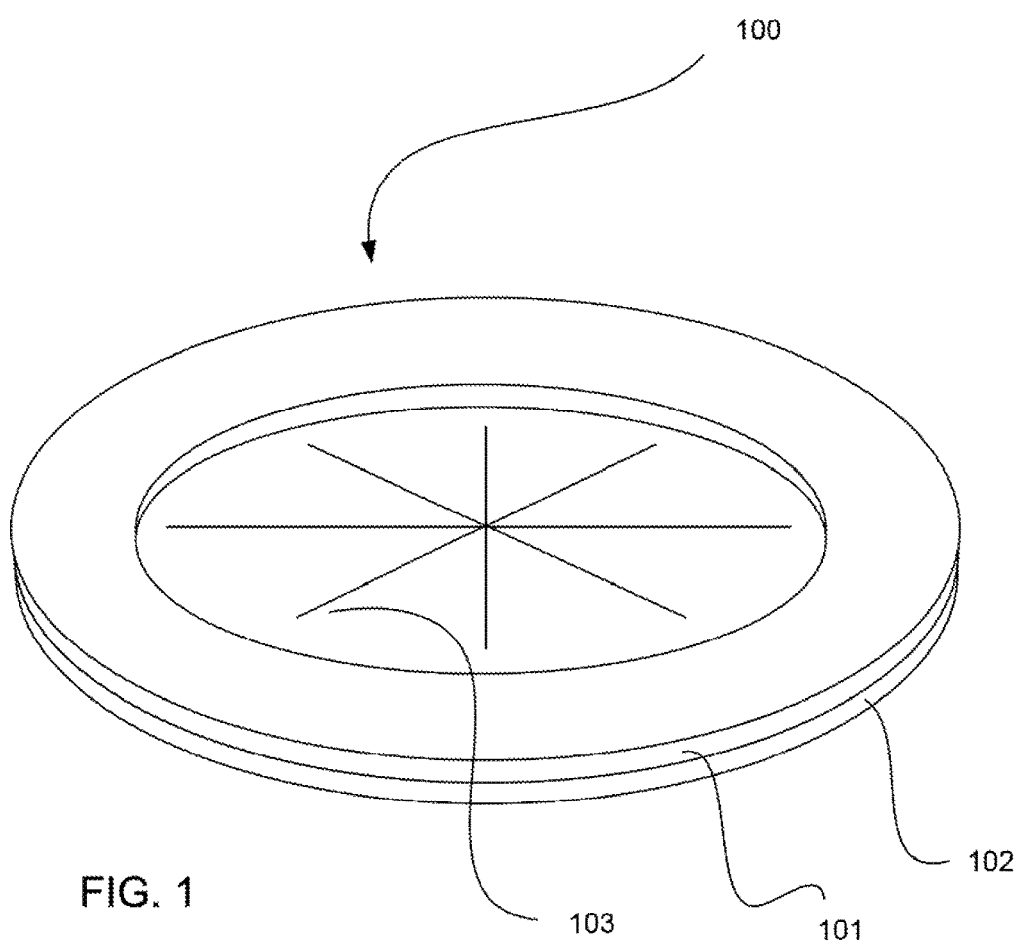
FIG. 1 includes an illustration of an exemplary pre-slit donut break seal.

As illustrated in FIG. 1, a break seal 100 comprises a foam sheet 101 having a center hole and a film layer 102. The film layer 102 can be scored with a star shape 103.

A method for forming a seal comprises laminating a foam sheet to a film layer. The foam sheet can be formed of a thermoplastic polymer. The thermoplastic polymer can include a polyolefin, such as polyethylene (PE) such as high density polyethylene (HDPE), medium density polyethylene (MDPE), low density polyethylene (LDPE), ultra low density polyethylene, or any combination thereof; polypropylene (PP); polybutene; polypentene; polymethylpentene; or any combination thereof. In another example, the thermoplastic can include a polyamide (PA) such as nylon, including nylon 6, nylon 6,6, nylon 11, nylon 12, or any combination thereof. In a further example, the thermoplastic can include polyacrylate (acrylic), polyketone (PK), polycarbonate (PC), polyetheretherketone (PEEK), polybutadiene (PBD), polyimide (PI), polyetherimide (PEI), polystyrene (PS), polysulfone (PSU), polyurethane (PU), polyvinyl acetate (PVA), polyvinyl chloride (PVC), polyester, or any combination thereof. An exemplary polyester can include polybutylene terephthalate (PBT), polyethylene terephthalate (PET), polytrimethylene terephthalate (PIT), or any combination thereof. In a particular example, the thermoplastic polymer includes polyethylene (PE).

Figure 3:
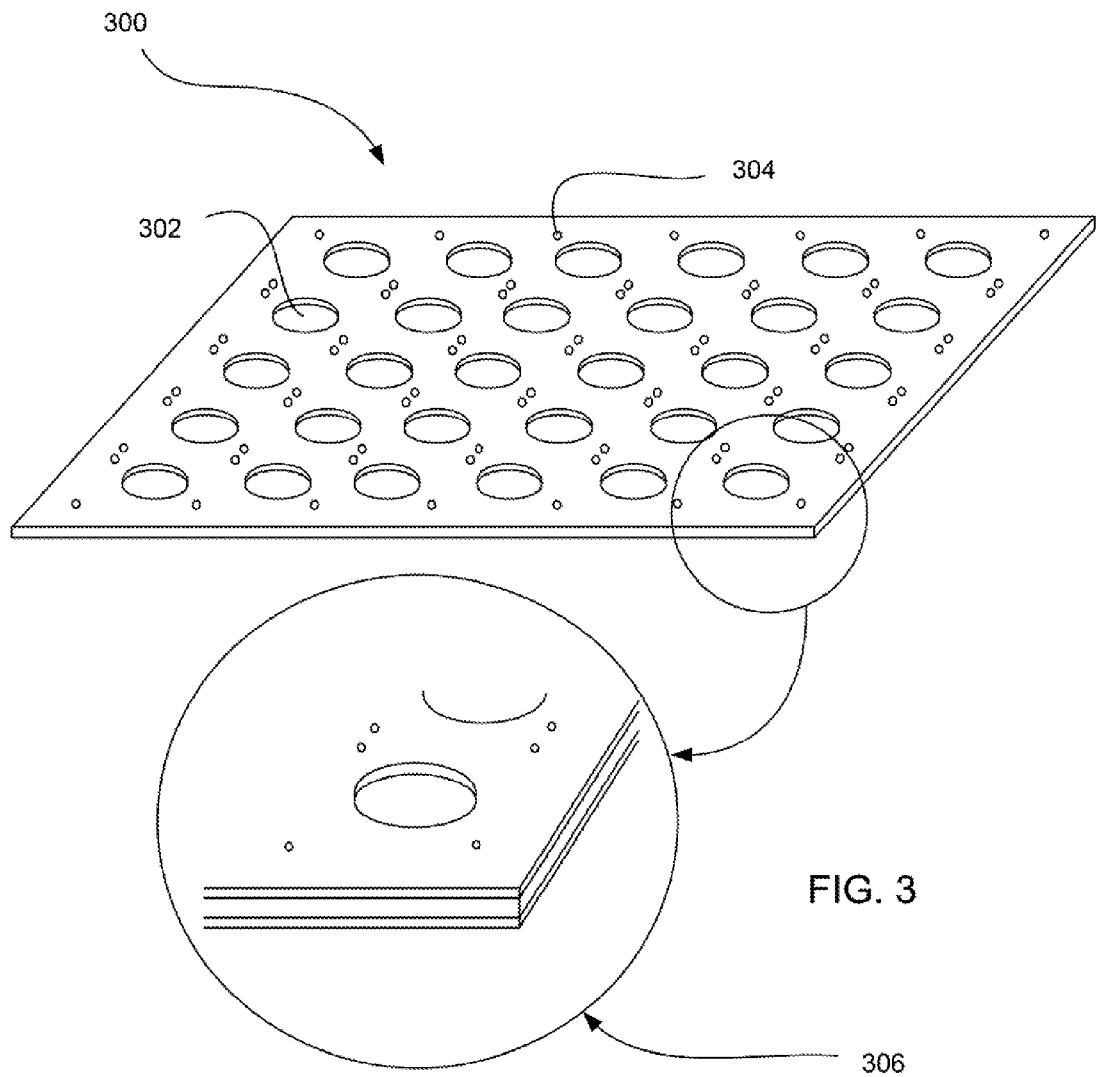
FIG. 3 includes an illustration of an exemplary pre-punched foam sheet and an enlarged view of a corner of the foam sheet.

As illustrated in FIG. 3, the foam sheet 300 as illustrated at 306 can comprise more than one layer. For example, the foam sheet 300 can include three layers, for example, a three-ply co-extruded material of a foamed thermoplastic polymer, such as low density polyethylene foam core between two film layers of thermoplastic polymer, such as low density polyethylene film.

Also illustrated in FIG. 3, the foam sheet 300 can be pre-punched with holes 302. The holes can have a diameter of 0.5 inches to 5 inches. For example, the diameter can be at least 0.75 inches, such as at least 0.95 inches. In one example, the diameter can be about 1.159 inches. In particular, the diameter can be not greater than 3 inches, such as not greater than 2.3 inches. The holes can be bracketed by small guide holes 304. The guide holes 304 can be arranged in the shape of a square around the holes 302, wherein the guide holes 304 are located at the corner of each square encompassing the holes 302. In another embodiment, the foam sheet 300 can be formed without guide holes 304.

The foam sheet 300 can have a density of 26 lb/ft$^3$ to 34 lb/ft$^3$. For example, the thermoplastic polymer can have a density of at least 28 lb/ft$^3$, such as at least 29 lb/ft$^3$. In an example, the density of the thermoplastic polymer is not greater than 32 lb/ft$^3$, such as not greater than 31 lb/ft$^3$.

The foam sheet 300 can have a thickness of 0.020 inches to 0.125 inches. In an example, the thickness of the foam sheet 300 can be at least 0.050 inches, such as at least 0.060 inches. In a further example, the thickness of the foam sheet 300 can be not greater than 0.095 inches, such as not greater than 0.090 inches.

Figure 4:
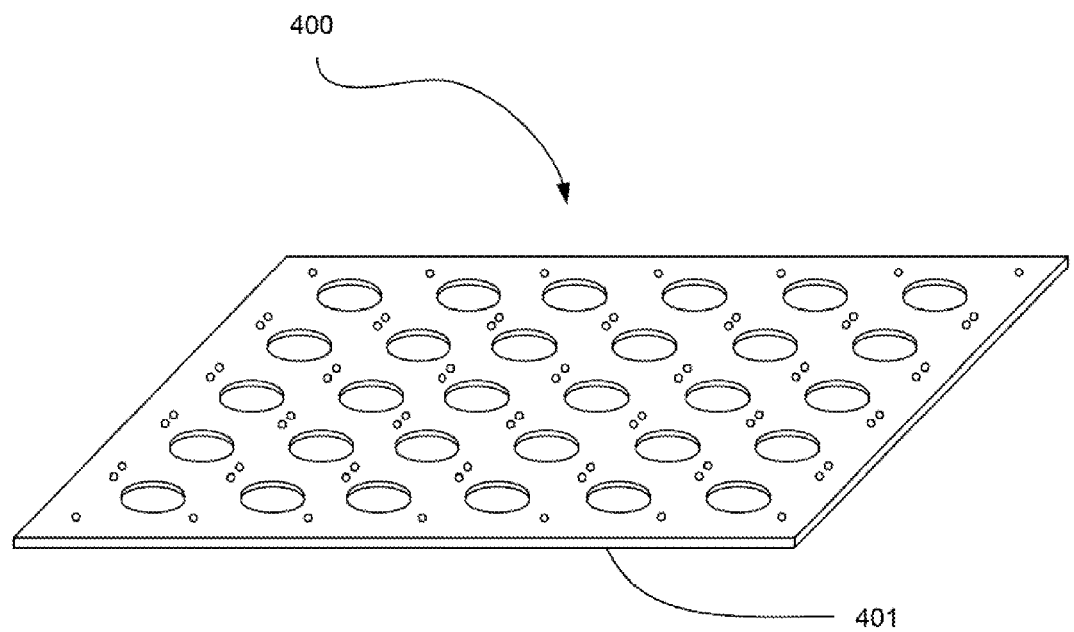
FIG. 4 includes an illustration of exemplary precursors of a pre-slit donut break seal.
Figure 4:
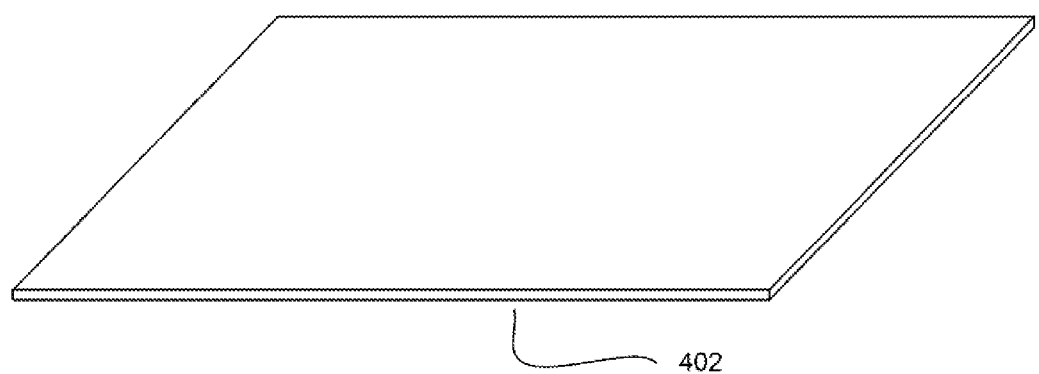

As illustrated in FIG. 4, a foam sheet 401 is attached to a film layer 402. The film layer 402 can be formed of a fluoropolymer. The fluoropolymer can include polytetrafluoroethylene (PTFE), perfluoroalkoxy (PFA), fluorinated ethylene propylene (FEP), tetrafluoroethylene perfluoromethylvinylether (MFA), tetrafluoroethylene hexafluoropropylene vinylidene fluoride (THV), ethylene tetrafluoroethylene (ETFE), ethylene chlorotrifluoroethylene (ECTFE), polyvinylidene fluoride (PVDF), polyether ether ketone (PEEK), polyhexafluoropropylene (PHFP), and polyvinylidene fluoride (PVDF). In particular, the fluoropolymer can be a perfluoropolymer. In a particular example, the fluoropolymer includes polytetrafluoroethylene (PTFE).

In a further example, the film layer 402 is a skived film, for example, skived from a billet of fluoropolymer material. The film layer 402 can have a thickness of 0.003 inches to 0.063 inches. In an example, the film layer 402 can have a thickness of at least 0.009 inches, such as at least 0.0095 inches. In another example, the film layer 402 can have thickness of 0.005 inches. In another example, the film layer 402 can have thickness of 0.008 inches. In a further example, the film layer 402 can have a thickness of not greater than 0.05 inches, such as not greater than 0.023 inches.

In a further example, the film layer 402 has a density of 2.10 g/cc to 2.22 g/cc. For example, the film layer 402 can have a density of at least 2.13 g/cc, such as 2.15 g/cc. In a particular example, the density of the film layer 402 can be not greater than 2.19 g/cc, such as not greater than 2.17 g/cc.

In a further example, the film layer 402 exhibits an elongation-at-break of at least 200%, such as at least 250%, or even at least 280%. In a particular example, the elongation-at-break can be not greater than 500%, such as not greater than 300%.

The film layer 402 can have a Shore D hardness of at least 50. In an example, the Shore D hardness can be at least 54, such as at least 56. In a further example, the Shore D harness of the film layer 402 can be not greater than 60.

The film layer 402 can exhibit a tensile strength of at least 3800 psi. In an example, the tensile strength of the film layer can be at least 3900 psi, such as at least 4000 psi. In a further example, the tensile strength can be not greater than 4200 psi.

Figure 5:
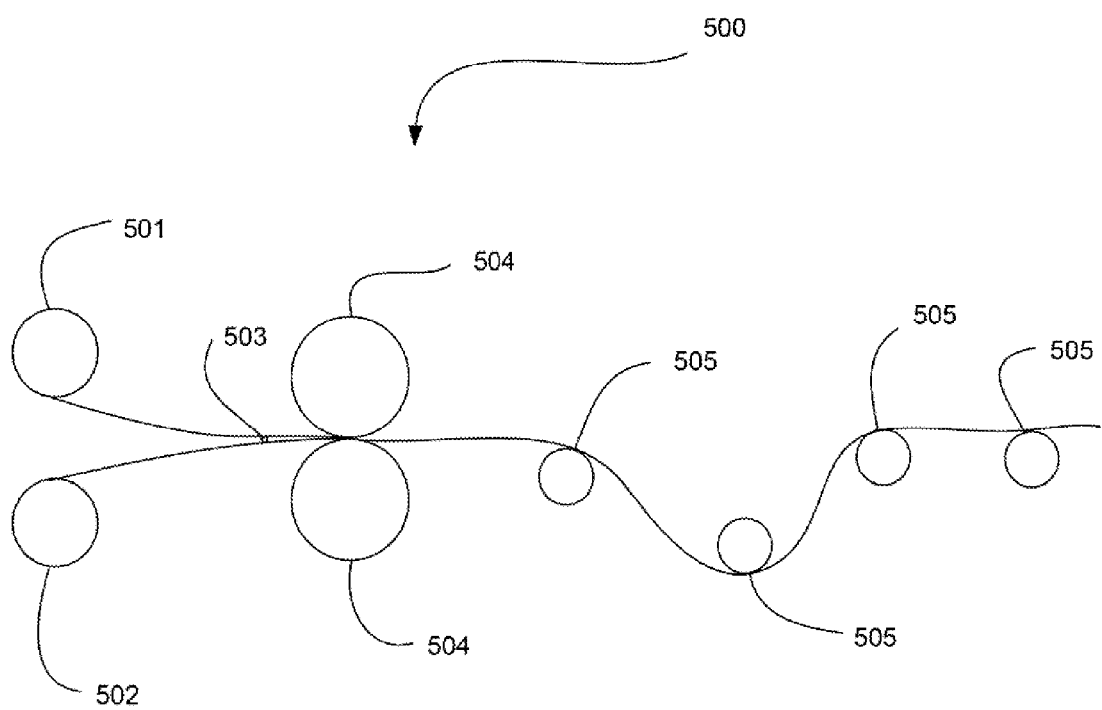
FIG. 5 includes an illustration of an exemplary method of flame lamination.

As illustrated in FIG. 5, a seal can be formed from a foam sheet flame laminated to a film sheet without intervening layers. A roll of foam 501 with preformed openings is dispensed in a horizontal alignment. A roll of film 502 is located adjacent to the roll of foam 501 and dispensed horizontally. An open flame 503 located between the sheet of foam 501 and the sheet of film 502 heats both the sheet of foam 501 and the sheet of film 502. The heated foam 501 and film 502 are pressed together by large rollers 504, forming a laminate.

The temperature of the flame 503 can be at least 1000° F. when measured one to two inches from the foam sheet 501 and film layers 502. In an example, the temperature of the flame 503 can be at least 1100° F., such as at least 1200° F. two inches from the foam sheet 501 and film layers 502. In a further example, the flame 503 can be not greater than 1300° F. two inches from the product.

The open flame 503 can have a temperature of at least 500° F. at the surface of the sheet or film. In an example, the open flame 503 can have a temperature of at least 550° F. at the surface of the sheet or film. In a further example, the open flame 503 can have a temperature at the surface not greater than 600° F.

Following pressing of the heated foam sheet 501 to the heated film 502 to form a construct, the laminate can be fed across several cooling rolls 505. Rolling the laminate across the cooling rolls 505 decreases the temperature of the laminate. In an example, the laminate is cooled to not greater than 120° C., such as not greater than 110° C., or even not greater than 100° C. When the laminate is sufficiently cooled, the laminate is rolled and set aside to continue cooling to ambient temperature.

When the laminate is cool, the seal body is cut from the laminate. In an example, the seal is cut by a stamping operation. Guide holes 304 can be used to ensure the proper placement of the cut.

The film layer of the seal can be scored. The scored lines can be continuous or intermittent. The score lines can be formed by any conventional method of stamping or scoring, such as with a punch press. In an example, the film can be scored at the same time as the seal is cut from the laminate. In another example, the film is scored before the seal body is cut out. In yet another example, the film is scored after the seal body is cut out.

In an example, the film is scored in the shape of a star comprising a plurality of lines. In a particular example, the star shape has at least four points, such as at least eight points. The lines are scored through the thickness of the film at a depth of 0.5 mils to 13.0 mils. In an example, the lines of the star shape can be scored through the thickness of the film at a depth of at least 0.7 mils, such as at least 0.85 mils, or even at least 1.0 mils. In another example, the lines of the star shape can be scored through the thickness of the film at a depth of at least 2.0 mils, such as at least 5.0 mils, at least 8.0 mils, at least 10.0 mils, or even at least 12.0 mils. In a further example, the lines can be scored through the thickness of the film at a depth not greater than 1.8 mils, such as not greater than 1.5 mils, or even not greater than 1.3 mils. In yet a further example, the lines can be scored through the thickness of the film at a depth not greater than 13.0 mils, such as not greater than 10.5 mils, such as not greater than 7.0 mils, such as not greater than 5.0 mils, or even not greater than 2.5 mils. In a further example, the film can be scored in the shape of a star such that the angle between adjacent lines comprising the star shape is at least about 1°. In another example, the film can be scored such that the angle between adjacent lines comprising the star shape is at least about 15°, such as at least about 30°, or even at least about 45°. In a further example, the film can be scored such that the angle between adjacent lines comprising the star shape is at most about 90°, such as at most about 60°.

In a further example, the lines of the star shape 103 scored into the film layer 102 are at least 0.40 inches long. In a further example, the lines of the star shape 103 scored into the film layer 102 are at least 0.50 inches long, such as at least 0.70 inches long, or even at least 0.75 inches long. In a further example, the lines of the star shape 103 scored into the film layer 102 are not greater than 3 inches long. In a further example, the lines of the star shape 103 scored into the film layer 102 are not greater than 2 inches long, such as not greater than 1.6 inches long, or even not greater than 1.4 inches long. In a further example, the length of the lines of the star shape 103 scored into the film layer 102 is at least 87% of the inner diameter of the hole 302 in the foam sheet 300. In a further example, the length of the lines of the star shape 103 scored into the film layer 102 is at least 90%, such as at least 95%, or even at least 97% of the inner diameter of the hole 302 in the foam sheet 300.

Figure 2:
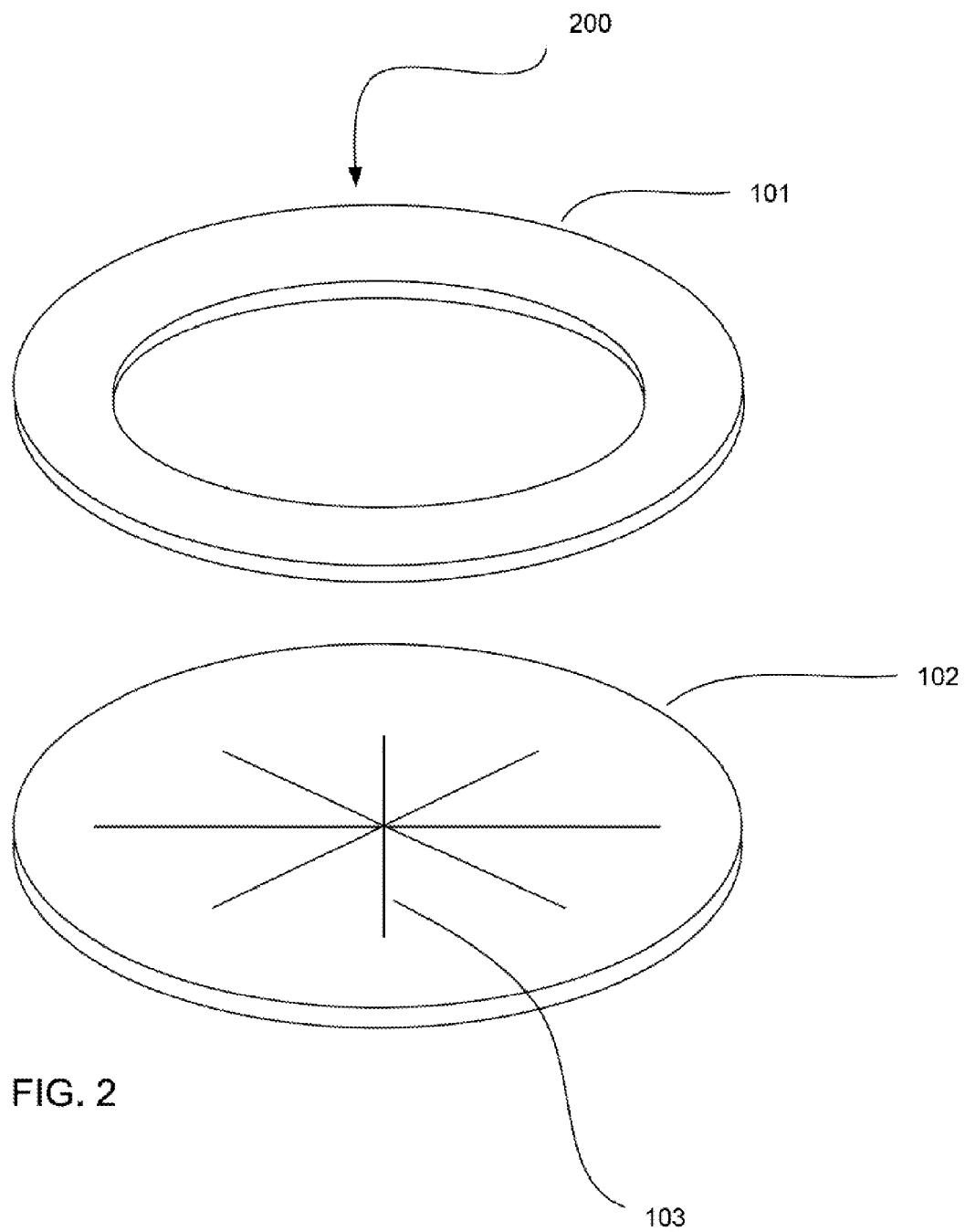
FIG. 2 includes an illustration of an exemplary example of the components of a pre-slit donut break seal.

As illustrated in FIG. 2, an exemplary seal body 200 comprises a foam ring and a film disc. In an example, the foam sheet can have a thickness of 0.020 inches to 0.125 inches. In a further example, the foam sheet can comprise a center hole with a diameter of 0.5 inches to 5 inches. Attached to the foam layer without intervening layers can be a film disc. In an example, the film disc can have a thickness of 0.008 inches to 0.063 inches. In a further example, the film disc can be scored in a star shape, wherein the star shape comprises at least four points, or even at least eight points. The seal body can have an outer diameter of 0.8 inches to 7 inches. In an example, the seal comprises an outer diameter of 1.3 inches to 6.2 inches, such as 1.6 inches to 5.3 inches.

In an example, the seal comprises a peel strength of at least 1.25 lb/in. In a further example, the seal comprises a peel strength of at least 1.5 lb/in, such as at least 2 lb/in, at least 2.5 lb/in, or even at least 3 lb/in.

A container can comprise a vessel with an opening. Such a vessel can comprise a seal covering the opening in said vessel. In such a situation, the seal can comprise a foam layer with an opening in the center overlying a film layer, the film layer comprising a star shape scored within it.

In a first embodiment, a seal includes a foam sheet having first and second major surfaces and having an outer contour and an inner contour, the inner contour defining an opening. The foam sheet includes a thermoplastic polymer. The seal also includes a film directly contacting the first major surface of the foam sheet without intervening layers. The film extends inwardly beyond the inner contour and the film includes a fluoropolymer. In an example of the first embodiment, the foam layer includes a thermoplastic polymer. In a further example, the thermoplastic polymer includes polyethylene. In another example of the first embodiment, the film layer includes a fluoropolymer. In another example, the film layer includes a perfluoropolymer. In a further example, the perfluoropolymer includes polytetrafluoroethylene.

In an example of the first embodiment, the foam layer has a thickness in a range between 0.020 inches to 0.125 inches. In another example, the foam layer has a thickness in a range between 0.050 inches to 0.095 inches. In a further example, the foam layer has a thickness in a range between 0.060 inches to 0.090 inches. In another example of the first embodiment, the foam layer has a density in a range between 26 lb/ft$^3$ to 34 lb/ft$^3$. In another example, the foam layer has a density in a range between 28 lb/ft$^3$ to 32 lb/ft$^3$. In a further example, the foam layer has a density in a range between 29 lb/ft$^3$ to 31 lb/ft$^3$.

In an example of the first embodiment, the film layer has a thickness in a range between 0.008 inches to 0.063 inches. In another example, the film layer has a thickness in a range between 0.009 inches to 0.023 inches. In a further example, the film layer has a thickness in a range between 0.0095 inches to 0.023 inches.

In an example of the first embodiment, the film layer has a density in a range between 2.10 g/cm$^3$ to 2.22 g/cm$^3$. In another example, the film layer has a density in a range between 2.13 g/cm$^3$ to 2.19 g/cm$^3$. In a further example, the film layer has a density in a range between 2.15 g/cm$^3$ to 2.17 g/cm$^3$.

In an example of the first embodiment, the film layer has a tensile strength of at least 3800 psi. In another example, the film layer has a tensile strength of at least 3900 psi. In a further example, the film layer has a tensile strength of at least 4000 psi. In yet another example, the film layer has a tensile strength of at most 4200 psi.

In an example of the first embodiment, the film layer has an elongation-at-break of at least 200%. In another example, the film layer has an elongation-at-break of at least 250%. In a further example, the film layer has an elongation-at-break of at least 280%. In a further example, the film layer has an elongation-at-break of at most 300%.

In an example of the first embodiment, the film layer has a Shore D hardness of at least 50. In another example, the film layer has a Shore D hardness of at least 54. In another example, the film layer has a Shore D hardness of at least 56. In a further example, the film layer has a Shore D hardness of at most 60.

In an example of the first embodiment, the seal has an outer diameter in a range between 0.8 inches to 7 inches. In another example of the first embodiment, the seal has an outer diameter in a range between 1.3 inches to 6.2 inches. In a further example of the first embodiment, the seal has an outer diameter in a range between 1.6 inches to 5.3 inches. In an example of the first embodiment, the seal has an inner opening with a diameter in a range between 0.5 inches to 5 inches. In another example of the first embodiment, the seal has an inner opening with a diameter in a range between 0.75 inches to 3 inches. In a further example of the first embodiment, the seal has an inner opening with a diameter in a range between 0.95 inches to 2.3 inches.

In an example of the first embodiment, the film layer is partially scored through the thickness. In another example, the film layer is scored through the thickness at a depth in a range between 0.5 mils to 2.0 mils. In another example, the film layer is scored through the thickness at a depth in a range between 0.7 mils to 1.8 mils. In another example, the film layer is scored through the thickness at a depth in a range between 0.85 mils to 1.5 mils. In a further example, the film layer is scored through the thickness at a depth in a range between 1.0 mil to 1.3 mils.

In another example, the film layer is partially scored through the thickness in a star shape. In another example, the star shape includes at least four points. In a further example, the star shape includes at least eight points. In a further example, the film layer is scored through the thickness in a star shape and the angle between adjacent lines of the star shape is at least about 1°. In another example, the angle between adjacent lines of the star shape is at least about 15°. In another example, the angle between adjacent lines of the star shape is at least about 30°. In a further example, the angle between adjacent lines of the star shape is at least about 45°. In another example, the angle between adjacent lines of the star shape is at most about 90°. In a further example, the angle between adjacent lines of the star shape is at most about 60°.

In an example of the first embodiment, the film layer is scored through the thickness in a star shape and the lines of the star shape are at least about 0.3 inches long. In another example of the first embodiment, the lines of the star shape are at least about 0.5 inches long. In a further example, the lines of the star shape are at least about 0.7 inches long.

In an example of the first embodiment, the lines of the star shape are at most about 3 inches long. In another example, the lines of the star shape are at most about 2 inches long. In another example, the lines of the star shape are at most about 1.6 inches long. In a further example, the lines of the star shape are at most about 1.4 inches long.

In an example of the first embodiment, the seal includes an inner opening with a diameter and the length of the lines of the star shape is at least about 65% of the diameter. In another example, the length of the lines of the star shape is at least about 87% of the diameter. In yet another example, the length of the lines of the star shape is at least about 90% of the diameter. In a further example, the length of the lines of the star shape is at least about 95% of the diameter.

In an example of the first embodiment, the seal has a peel strength of at least 1.5 lb/in. In another example of the first embodiment, the seal has a peel strength of at least 2 lb/in. In another example of the first embodiment, the seal has a peel strength of at least 2.5 lb/in. In a further example, the seal has a peel strength of at least 3 lb/in.

In a second embodiment, a method of making a seal includes dispensing, in horizontal alignment, a foam sheet includes a thermoplastic polymer and having preformed openings; dispensing, in horizontal alignment, a fluoropolymer film adjacent the foam sheet; heating the foam sheet and the fluoropolymer film with an open flame which is positioned between the foam sheet and the fluoropolymer film; pressing the foam sheet to the fluoropolymer film to form a construct without intervening layers between the foam sheet and the fluoropolymer film; cooling the construct; and cutting a seal body from the construct. The seal body includes a foam layer and a fluoropolymer film layer, a preformed opening which defines an inner contour of the foam layer, and an outer contour. The fluoropolymer film layer extends inwardly from the outer contour beyond the inner contour.

In an example of the second embodiment, the open flame has a temperature of at least 1000° F. two inches from a surface of the foam sheet. In another example of the second embodiment, the open flame has a temperature of at least 1100° F. two inches from the surface of the foam sheet. In another example, the open flame has a temperature of at least 1200° F. two inches from the surface. In a further example, the open flame has a temperature of at most 1300° F. two inches from the surface. In an example of the second embodiment, the open flame has a temperature of at least 500° F. at the surface of the foam sheet. In another example, the open flame has a temperature of at least 550° F. at the surface of the foam sheet. In a further example, the open flame has a temperature of at least 600° F. at the surface of the foam sheet.

In an example of the second embodiment, the method includes a step of scoring the fluoropolymer layer. In another example, the fluoropolymer layer is scored in a star shape. In another example, the star shape includes at least four points. In a further example, the star shape includes at least eight points.

In another example of the second embodiment, scoring the fluoropolymer layer includes scoring through the thickness at a depth in a range between 0.5 mils to 2.0 mils. In another example, scoring the fluoropolymer layer includes scoring through the thickness at a depth of at least 0.7 mils and not greater than 1.8 mils. In another example, the fluoropolymer layer is scored through the thickness at a depth of at least 0.85 mils and not greater than 1.5 mils. In a further example, the fluoropolymer layer is scored through the thickness at a depth of at least 1.0 mil and not greater than 1.3 mils.

In a third embodiment, a container includes a vessel having an opening and a seal covering the opening in the vessel, wherein the seal includes a foam sheet having first and second major surfaces and an outer contour and an inner contour. The inner contour defines an opening. The foam sheet includes a thermoplastic polymer and a film directly contacting the first major surface of the foam sheet without intervening layers. The film extends inwardly beyond the inner contour, and the film includes a fluoropolymer.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

As used herein, the terms "includes", "comprising", "includes", "including", "has", "having" or any other variation thereof, are intended to cover a non-exclusive inclusion. For example, a process, method, article, or apparatus that includes a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A seal consisting of:
   a foam sheet having first and second major surfaces and having an outer contour and an inner contour, the inner contour defining an opening, the foam sheet comprising a thermoplastic polymer; and
   a film layer directly contacting and bonded to the first major surface of the foam sheet without intervening layers, the film layer extending inwardly beyond the inner contour and horizontally across the opening of the foam sheet and the film layer comprising a fluoropolymer, wherein a portion of the film layer across the opening of the foam sheet is partially scored through a thickness of the film layer, wherein the seal provides a hermetic seal to an opening of a vessel.

2. The seal of claim 1, wherein the seal has an outer diameter in a range between 0.8 inches to 7 inches.

3. The seal of claim 1, wherein the seal has a peel strength of at least 1.25 lb/in.

4. The seal of claim 1, wherein the foam sheet has a thickness in a range between 0.020 inches to 0.125 inches.

5. The seal of claim 1, wherein the foam sheet has a density in a range between 26 lb/ft$^3$ to 34 lb/ft$^3$.

6. The seal of claim 1, wherein the fluoropolymer comprises a perfluoropolymer.

7. The seal of claim 1, wherein the film layer has a thickness in a range between 0.008 inches to 0.063 inches.

8. The seal of claim 1, wherein the film layer has a tensile strength of at least 3800 psi (26.2 MPa).

9. The seal of claim 1, wherein the film layer has a Shore D hardness of at least 50.

10. The seal of claim 1, wherein the film layer is partially scored through the thickness in a star shape.

11. The seal of claim 10, wherein the star shape comprises at least four points.

* * * * *